Patented Aug. 2, 1949

2,477,656

UNITED STATES PATENT OFFICE 2,477,656

COPOLYMERIC VINYLIDENE CHLORIDE COMPOSITIONS

Hugo L. Schaefer, Midland, and Carl B. Havens, Hope, Mich., assignors to The Dow Chemical Company, Midland, Mich., a corporation of Delaware No Drawing. Application January 30, 1947, Serial No. 725,272

4 Claims. (Cl. 260—31.6)

This invention relates to a specific composition consisting of a particular vinylidene chloride-vinyl chloride copolymer and small amounts of certain modifying agents therefor. It relates in particular to such a composition, capable of being extruded and stretched in normal manner to produce translucent, odorless films which are not discolored by the heat of extrusion, are highly resistant to discoloration on exposure to light, and which do not exude their contained modifying agents.

Within the past few years the copolymers of vinylidene and vinyl chlorides have become industrially important. Some of them are unique by virtue of their now well-known crystalline character. Of these, the most important copolymers have been those which may be obtained by polymerizing, in aqueous suspension, a mixture of about 85 per cent by weight of vinylidene chloride and about 15 per cent of vinyl chloride, under conditions to yield a copolymer of about 88–94 per cent of vinylidene chloride copolymerized with about 12–6 per cent of vinyl chloride. This range of products may be extruded readily when properly modified, but cannot be extruded to form useful products without having present a modifying agent to serve as a plasticizer during the exposure to high temperatures in the extrusion zone, and to depress the softening point and increase the thermal stability. Without such agents, the product decomposes at elevated temperatures to such an extent as to discolor it and make the extruded article unacceptable for commercial use. The modifier should have, as well, a protective effect against the action of direct sunlight, which tends to darken the extruded article to unacceptable shades.

It has been the prior experience that very few of the common "plasticizers" can be used to assist in extrusion of the identified copolymer, and that when thin extruded articles such as films or fine filaments are to be made, the number of operative plasticizers is still smaller. With most such modifiers, the heat of extrusion results in a thermal degradation of the copolymer, evidenced by darkening and by evolution of hydrogen chloride, indicative of decomposition. The resulting products are often brittle, and are subject to further darkening when exposed to light containing ultraviolet radiations. Those few plasticizers which have been used successively with the present copolymer, notable among which is di-(alpha-phenylethyl) ether, have exuded to the surface of the crystalline article after it has been formed by extrusion, supercooling and stretching in the manner which is now well known. Such exudation gives the article an undesirably oily surface. This is especially noticeable with multi-directionally stretched thin (0.005 inch, or less) film made from the described copolymer, as such film, due to the arrangement of the submicroscopic crystallites, has a minimum capacity for internal modifiers. Most plasticizers used with the copolymer, which have the faculty of assisting the extrusion, have distinct and commonly disagreeable odors, and films of the present copolymer containing them usually exhibit these odors to an even more pronounced extent and cannot be used for packaging foodstuffs because of the fact that they impart foreign flavors or odors to the enclosed foods. Since the described copolymer, when in the form of a film, has the lowest moisture vapor transmission values of any commercial film (from 0.5 to 0.1 the values for the best other films), it is highly desirable to find a means for extruding the copolymer without danger of subsequent exudation and the other named prior disadvantages.

The defined range of vinylidene chloride-vinyl chloride copolymers is unique in its properties and in the problems which it presents during extrusion. Larger amounts of vinyl chloride in the copolymer increase its compatibility with plasticizers and decrease its extrusion temperature, but are accompanied by increased sensitivity to organic solvents and films made therefrom are less strong and less crystalline than those here concerned. Similarly, lesser amounts of vinyl chloride in the copolymer are accompanied by higher fusion temperatures, decreased flexibility in extruded articles, almost complete incompatibility with plasticizers, and relatively very limited utility.

It is accordingly among the objects of the present invention to provide a composition of matter containing the above-identified copolymer and such adjuvants as may be required to extrude the same easily without thermal decomposition, which is capable of being extruded and stretched to form an oriented crystalline thin film which is clear and transparent, odorless, does not exude said adjuvants on standing, either at or above room temperature, and is resistant to discoloration when exposed to sunlight. It is an ultimate object to provide a thin oriented crystalline film of the said copolymer, which film possesses the above-stated desired properties.

It has now been found that the foregoing and related objects may be attained by the preparation of a particular composition consisting of at least 90 and not to exceed 95 per cent by weight of the copolymer containing from 88 to 94 per cent of vinylidene chloride copolymerized with correspondingly from 12 to 6 per cent of vinyl chloride, and from 10 to 5 per cent in the aggregate of the following three modifiers in the respective range of individual amounts shown: (1) from 0.5 to 1 per cent of tetrasodium pyrophosphate, (2) from 2 to 5 per cent of 4'-tertiary-butyl phenyl salicylate, and (3) from 2 to 5 per cent of an alkyl phthalyl ethyl glycolate in which alkyl is selected from the group consisting of methyl and ethyl. The so-defined composition is compatible, not only at the elevated temperatures encountered during extrusion operations, but also in the oriented product at and above room temperature after extrusion, so that extruded articles show no tendency to exude the contained modifiers, and have no oily appearance or feel. Even when the extruded article is a fine fiber or a thin film, it exhibits no significant odor, and such films may be used without danger to wrap cheese, butter or other foodstuffs which are very receptive of foreign tastes. Such films are relatively unaffected by sunlight, as evidenced by the fact that when exposed to Florida sunshine for 6 months, the films of the present composition had assumed a mild straw tint, while the heretofore commercial film, containing the same copolymer plasticized with 7 per cent of its weight of di-(alpha-phenylethyl)ether acquired a very dark brown to black coloration after about one month.

By way of contrast with the present specific composition, when the previously defined copolymer is modified by either the salicylate or the glycolate alone, or by mixtures thereof, in quantities sufficient to permit extrusion without thermal decomposition, the extruded product, especially in film form, is defective in one or more important respects. Tetrasodium pyrophosphate is not a plasticizer, and does not lower the flow viscosity of the copolymer. When either of the alkyl phthalyl ethyl glycolates are used alone with the copolymer, extrusion is nearly impossible, regardless of the amount of plasticizer employed, the film is darkened badly during extrusion, and is darkened further on exposure to light. When 4'-tertiary-butyl phenyl salicylate is used alone extrusion is again nearly impossible resulting films exude the plasticizer as a crystalline bloom, have a characteristic odor, and show signs of very marked deterioration due to the heat of extrusion. Similar evidence of thermal decomposition is noted when mixtures of the glycolate and the salicylate are employed.

The following examples illustrate the practice of the invention:

Example 1

A composition was prepared by mixing together in a ball mill 1 part by weight of tetrasodium pyrophosphate, 2 per cent by weight of 4'-tertiary-butyl phenyl salicylate, 3 parts by weight of methyl phthalyl ethyl glycolate, and 94 parts by weight of a copolymer of vinylidene and vinyl chlorides which was shown by analysis to contain 92 per cent of the former chloride copolymerized with 8 per cent of the latter. The composition was extruded at 175° C. as a tube 2.5 inches in diameter. The tube passed downwardly into a water bath at 10° C. to supercool it, thence between two spaced pairs of driven pinch rollers. The portion of tube between the orifice and the first set of rollers contained a column of mineral oil to a level slightly above that of the water bath. The section between the two sets of pinch rolls was inflated to provide an elongated bubble, enough air being used to expand the tube radially about four times its original extruded diameter. This stretching occurred between and removed from each of the sets of rollers. Addition of more air resulted only in elongation of the bubble and displacement of the stretching zone toward the first set of rollers, and not in a greater radial distension. The driven rollers had a peripheral speed about three times that of the idler rolls. The resulting film tube was slit in the customary manner to provide a film sheet about 31 inches wide and about 1.5 mils thick. The film was translucent and showed no signs of yellowing due to the heat of extrusion. Even on prolonged standing the film did not exude its contained modifiers, and had no noticeable or objectionable odor. In outdoor exposure to sunlight in Florida there was no darkening in one month and only a light straw tint developed in six months. Portions of the film were used to warp freshly cut blocks of cheddar cheese, and the wrapped product was kept for several days at moderate temperatures permitting the fats in the cheese to come into contact with the film. Slices from the six exposed surfaces of the cheese had no detectable foreign flavor. By way of contrast, a similarly produced film consisting of the same copolymer and 7 per cent of its weight of di-(alpha-phenyl ethyl) ether had a marked surface oiliness due to exudation immediately after it was produced, a strong and disagreeable odor, and would not be considered for use in contact with odor-sensitive foods. A roll of that film, on standing for a few weeks, actually dripped the exuded plasticizer.

Example 2

In similar manner, a composition was prepared consisting of 0.5 per cent tetrasodium pyrophosphate, 3.5 per cent ethyl phthalyl ethyl glycolate, 3.5 per cent 4'-tertiary-butyl phenyl salicylate, and 92.5 per cent of the same copolymer. When extruded and stretched in the manner set forth in Example 1, to form a film about 2 mils thick, the product was similarly free from evidence of thermal decomposition, and from tendency to exude its modifiers. The film was practically odor free, and contributed no foreign taste to cheese which was wrapped in it.

In a similar manner, other compositions of the same constituents have been prepared and tested, and it has been found that each modifier may be varied within the previously stated range, so long as the aggregate amount of all of these modifiers is from 5 to 10 per cent of the composition, with the same advantageous properties in the resulting compositions as are set out in the examples.

It is to be understood that die lubricants, such as waxes or magnesium stearate, may be used in the customary manner during extrusion of the present compositions. Such agents, being used only for their effect in lubrication of the composition through the extrusion die, are not considered essential parts of the composition.

We claim:

1. A composition of matter consisting of from 90 to 95 per cent by weight of the copolymer containing from 88 to 94 per cent of vinylidene chloride copolymerized with correspondingly from 12 to 6 per cent of vinyl chloride, and from 5 to 10 per cent in the aggregate of the following modifiers, each within the range of proportions stated: (1) from 0.5 to 1 per cent of tetrasodium pyrophosphate, (2) from 2 to 5 per cent of 4'-tertiary-butyl phenyl salicylate, and (3) from 2 to 5 per cent of an alkyl phthalyl ethyl glycolate wherein the alkyl group is selected from the class consisting of the methyl and ethyl radicals, said composition being readily extruded without thermal decomposition, to form translucent, non-exuding, odorless articles which are resistant to the darkening effects of direct sunlight.

2. A composition of matter consisting of from 90 to 95 per cent by weight of the copolymer containing from 88 to 94 per cent of vinylidene chloride copolymerized with correspondingly from 12 to 6 per cent of vinyl chloride, and from 5 to 10 per cent in the aggregate of the following modifiers, each within the range of proportions stated: (1) from 0.5 to 1 per cent of tetrasodium pyrophosphate, (2) from 2 to 5 per cent of 4'-tertiary-butyl phenyl salicylate, and (3) from 2 to 5 per cent of methyl phthalyl ethyl glycolate, said composition being readily extruded without thermal decomposition, to form translucent, non-exuding, odorless articles which are resistant to the darkening effects of direct sunlight.

3. A composition of matter consisting of from 90 to 95 per cent by weight of the copolymer containing from 88 to 94 per cent of vinylidene chloride copolymerized with correspondingly from 12 to 6 per cent of vinyl chloride, and from 5 to 10 per cent in the aggregate of the following modifiers, each within the range of proportions stated: (1) from 0.5 to 1 per cent of tetrasodium pyrophosphate, (2) from 2 to 5 per cent of 4'-tertiary-butyl phenyl salicylate, and (3) from 2 to 5 per cent of ethyl phthalyl ethyl glycolate, said composition being readily extruded without thermal decomposition, to form translucent, non-exuding, odorless articles which are resistant to the darkening effects of direct sunlight.

4. A translucent, odorless oriented crystalline film, which is resistant to discoloration due to light and is free from tendency to exude its contained modifiers, composed of the composition claimed in claim 1.

HUGO L. SCHAEFER.
CARL B. HAVENS.

REFERENCES CITED

The following references are of record in the file of this patent:

UNITED STATES PATENTS

| Number | Name | Date |
| --- | --- | --- |
| 2,245,742 | Alexander | June 17, 1941 |
| 2,270,662 | Raney | Jan. 20, 1942 |
| 2,328,748 | Scott | Sept. 7, 1943 |
| 2,364,410 | Whittaker | Dec. 5, 1944 |
| 2,429,155 | Boyer | Oct. 14, 1947 |